US005618566A

United States Patent [19]

Allen et al.

[11] Patent Number: 5,618,566

[45] Date of Patent: Apr. 8, 1997

[54] MODULAR MELTBLOWING DIE

[75] Inventors: Martin A. Allen; John T. Fetcko, both of Dawsonville, Ga.

[73] Assignee: Exxon Chemical Patents, Inc., Linden, N.J.

[21] Appl. No.: 429,193

[22] Filed: Apr. 26, 1995

[51] Int. Cl.[6] .............................. B29C 47/12; D01D 5/00

[52] U.S. Cl. ................................ 425/7; 264/12; 425/72.2; 425/192.5; 425/463; 425/464

[58] Field of Search ................................ 425/192.5, 72.2, 425/7, 461, 463, 464; 264/12

[56] References Cited

U.S. PATENT DOCUMENTS

| | | | |
|---|---|---|---|
| 3,562,858 | 2/1971 | Lehner | 425/192 S |
| 3,655,314 | 4/1972 | Lenk et al. | 425/192 S |
| 3,888,610 | 6/1975 | Brackmann et al. | 425/72.2 |
| 3,891,379 | 6/1975 | Lenk | 425/464 |
| 4,687,137 | 8/1987 | Boger et al. | 239/124 |
| 4,698,008 | 10/1987 | Lenk et al. | 425/192 S |
| 4,785,996 | 11/1988 | Ziecker et al. | 239/298 |
| 4,818,463 | 4/1989 | Buehning | 264/40.1 |
| 4,891,249 | 1/1990 | McIntyre | 427/421 |
| 4,949,668 | 8/1990 | Heindel et al. | 118/314 |
| 4,969,602 | 11/1990 | Scholl | 425/7 |
| 4,983,109 | 1/1991 | Miller et al. | 425/7 |
| 5,102,484 | 4/1992 | Allen et al. | 156/244.11 |
| 5,145,689 | 9/1992 | Allen et al. | 425/72.2 |
| 5,160,746 | 11/1992 | Dodge et al. | 425/7 |
| 5,236,641 | 8/1993 | Allen et al. | 425/72.2 |
| 5,269,670 | 12/1993 | Allen et al. | 425/7 |
| 5,354,529 | 10/1994 | Berger et al. | 425/192 S |
| 5,445,509 | 8/1995 | Allen et al. | 425/7 |

FOREIGN PATENT DOCUMENTS

| | | | |
|---|---|---|---|
| 0579912A1 | 1/1994 | European Pat. Off. . | |
| 1563686 | 11/1969 | France . | |
| 8534594 U | 3/1986 | Germany . | |
| 1451039 | 1/1989 | U.S.S.R. | 425/192 S |

OTHER PUBLICATIONS

"Application Potential of Controlled Fiberization Spray Tech," J. Raterman, Jan., 1988, 3 pages.

"The Controlled Fiberization of Pressure–Sensitive Hot––Melt Adhesives," J. Raterman, 5 pages, no date.

"Disposables Manufacturers from All Over the World," Nordson Corp. (1993), 3 pages.

*Primary Examiner*—Jay H. Woo
*Assistant Examiner*—Duane S. Smith
*Attorney, Agent, or Firm*—R. L. Graham

[57] ABSTRACT

Modular die constructions includes a plurality of side-by-side self-contained, interchangeable meltblowing modules on a manifold so that the length of the die can be varied by adding modules or removing modules from the manifold.

10 Claims, 4 Drawing Sheets

MODULAR MELTBLOWING DIE

BACKGROUND OF THE INVENTION

This invention relates generally to meltblowing dies. In one aspect the invention relates to a meltblowing die comprising a plurality of self-contained, interchangeable modular units. In another aspect, the invention relates to a modular meltblowing die for meltblowing adhesives onto a substrate.

Meltblowing is a process in which high velocity hot air (normally referred to as "primary air") is used to blow molten fibers extruded from a die onto a collector to form a web, or onto a substrate to form a coating or composite. The process employs a die provided with (a) a plurality of openings (e.g. orifices) formed in the apex of a triangular shaped die tip and (b) flanking air passages. As extruded rows of melt of the polymer melt emerge from the openings, the converging high velocity from air from the air passages contacts the filaments and by drag forces stretches and draws them down forming microsized filaments.

In some meltblowing dies, the openings are in the form of slots. In either design, the die tips are adapted to form a row of filaments which upon contact with the converging sheets of air are carried to and deposited on a collector or a substrate in a random manner.

Meltblowing technology was originally developed for producing nonwoven fabrics but recently has been utilized in the meltblowing of adhesives onto substrates.

In meltblowing adhesives, the filaments are drawn down to their final diameter of 5 to 50.0 microns, preferable 10 to 20.0 microns, and are deposited at random on a substrate to form an adhesive layer thereon onto which may be laminated another layer such as film or other types of materials or fabrics.

In the meltblowing of polymers to form nonwoven fabrics, the polymers, such as polyolefin, particularly polypropylene, are extruded as filaments and drawn down to an average fiber diameter of 0.5 to 10 microns and deposited at random on a collector to form a nonwoven fabric. The integrity of the nonwoven fabric is achieved by fiber entanglement with some fiber-to-fiber fusion. The nonwoven fabrics have many uses including oil wipes, surgical gowns, masks, filters, etc.

The filaments extruded from the die may be continuous or discontinuous. For the purpose of the present invention the term "filament" is used interchangeably with the term "fiber" and refers to both continuous and discontinuous strands.

The meltblowing process grew out of laboratory research by the Naval Research Laboratory which was published in Naval Research Laboratory Report 4364 "Manufacture of Superfine Organic Fibers," Apr. 15, 1954. Exxon Chemical developed a variety of commercial meltblowing dies, processes, and end-use products as evidenced by U.S. Pat. Nos. 3,650,866, 3,704,198, 3,755,527, 3,825,379, 3,849,241, 3,947,537, and 3,978,185 by Beloit and Kimberly Clark. Representative meltblowing patents of these two companies include U.S. Pat. Nos. 3,942,723, 4,100,324, and 4,526,733. More recent meltblowing die improvements are disclosed in U.S. Pat. Nos. 4,818,463 and 4,889,476.

U.S. Pat. No. 5,145,689 discloses dies constructed in side-by-side units with each unit having separate polymer flow systems including internal valves.

SUMMARY OF THE INVENTION

The meltblowing die of the present invention is completely modular in structure, comprising a plurality of self-contained meltblowing modules. The modules are mounted in side-by-side relationship on a manifold so that the length of the die can be varied by merely adding modules or removing modules from the structure. In a preferred embodiment, the modules are interchangeable and each includes an internal valve for controlling polymer flow therethrough.

The modular meltblowing die comprises a manifold and a plurality of modules mounted on the manifold. The manifold has formed therein polymer flow passages for delivering a hot melt adhesive polymer to each module and hot air flow passages for delivering hot air to each module.

Each module includes a body, a die tip assembly, and polymer and air flow passages for conducting hot melt adhesive and hot air from the manifold through each module.

The die tip assembly of each module includes a die tip having (a) a triangular nosepiece terminating in an apex and polymer discharge means at the apex for discharging a plurality of closely spaced filaments, and (b) air plates which in combination with the triangular nosepiece define converging air slits discharging at or near the apex.

Hot air which flows through the manifold and each module is discharged as converging sheets of hot air at or near the apex. Hot melt adhesive is flowing through the manifold and each module discharges as a plurality of filaments into the converging air sheets. The air sheets contact and draw down the filaments depositing them as random filaments onto a substrate.

A particularly advantageous feature of the modular die construction of the present invention is that it offers a highly versatile meltblowing die. The die tip is the most expensive component of the die, requiring extremely accurate machining (a tolerance of 0.0005 to 0.001 inches on die tip dimensions is typical). The cost of long dies is extremely expensive (on the order of $1,300/inch). By employing the modules, which are relatively inexpensive ($300/inch), the length of the die can economically be extended to lengths of 200 or more inches.

Another advantageous feature of the modular die construction is that it permits the repair or replacement of only the damaged or plugged portions of a die tip. With continuous die tips of prior art constructions, even those disclosed in U.S. Pat. No. 5,145,689, damage to or plugging of the die tip requires the complete replacement, or at least removal, of the die tip. With the present invention, only the damaged or plugged module needs replacement or removal which can be done quickly which results in reduced equipment and service costs.

DESCRIPTION OF THE PREFERRED EMBODIMENTS

Figure 3:
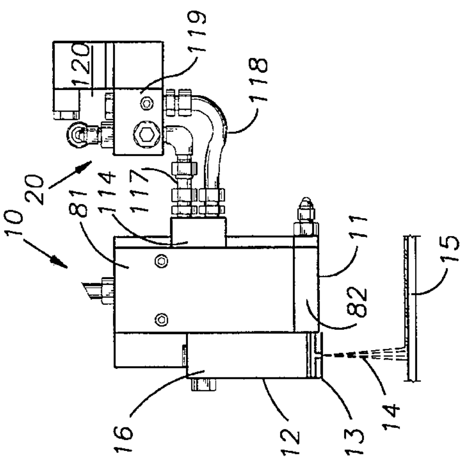
FIG. 3 is a side elevation view of the modular die shown in FIG. 2, illustrating the discharge of filaments onto a substrate.
Figure 1:
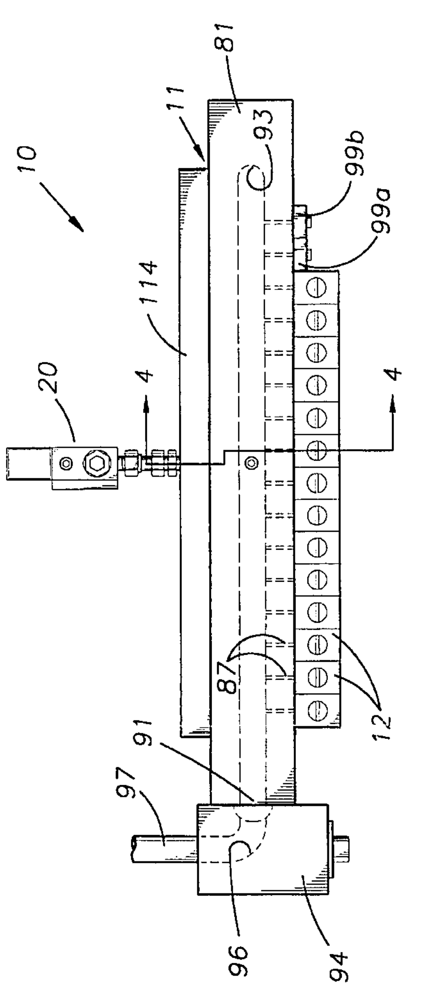
FIG. 1 is a top plan view of a meltblowing modular die assembly constructed according to the present invention.
Figure 2:
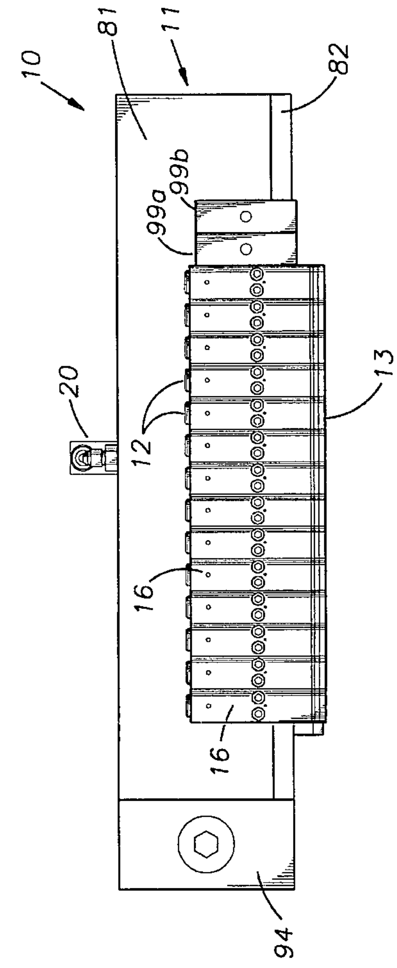
FIG. 2 is a front elevation view of the meltblowing modular die shown in FIG. 1.

With reference to FIGS. 1, 2, and 3, the modular meltblowing die assembly 10 of the present invention comprises a manifold 11, a plurality of side-by-side self-contained die modules 12, and a valve actuator assembly including actuator 20 for controlling the polymer flow through each module. Each module 12 includes a die body 16 and a die tip assembly for discharging a plurality of filaments 14 onto a substrate 15 (or collector). The manifold 11 distributes a polymer melt and hot air to each of the modules 12. Each of these components is described in detail below. Filaments 14 may be continuous or discontinuous strands.

Figure 4:
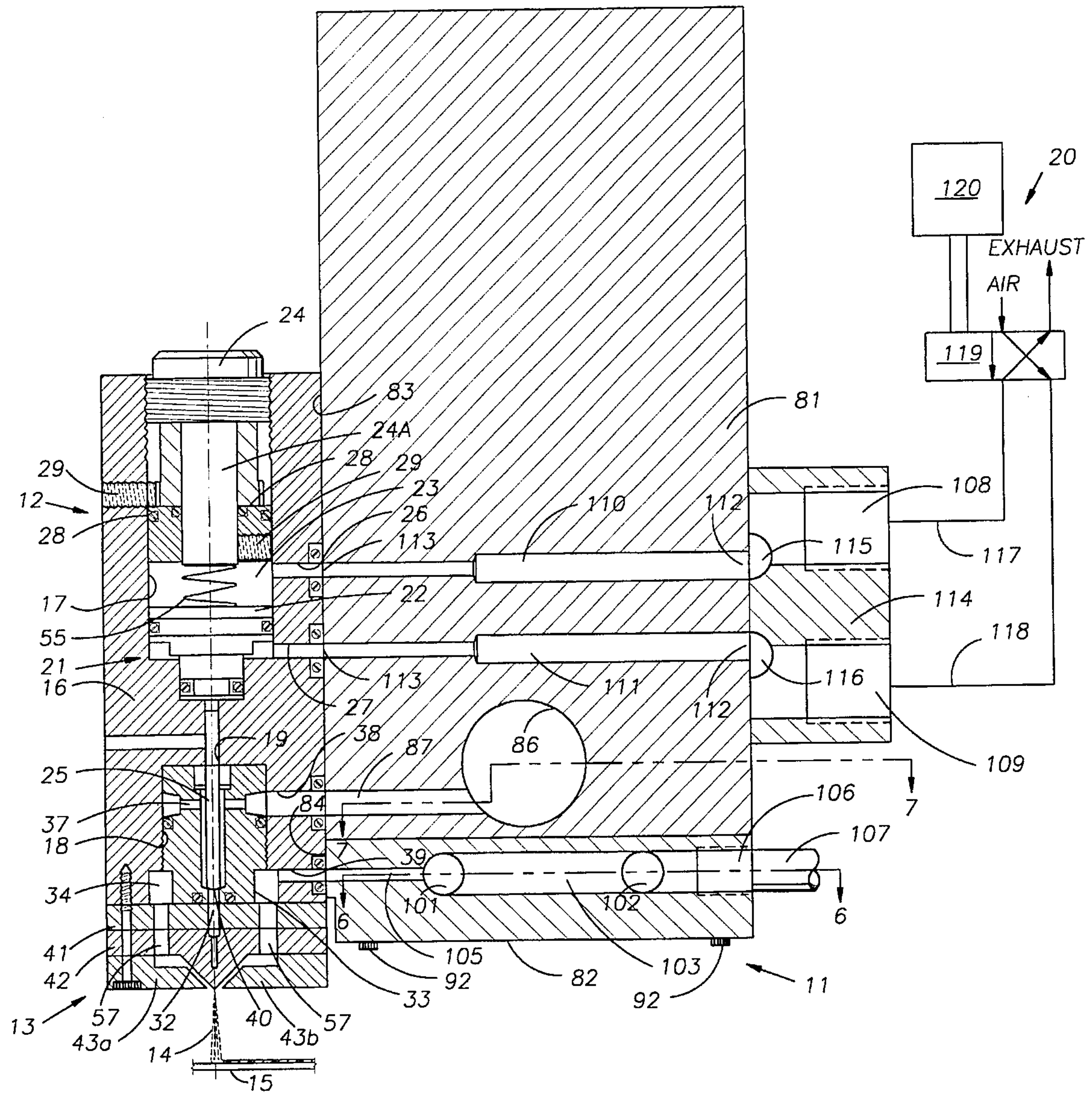
FIG. 4 is an enlarged sectional view taken along with cutting plane indicated by FIG. 4—4 of FIG. 1.

Die Modules:

As best seen in FIG. 4, die body 16 has formed therein an upper circular recess 17 and a lower circular recess 18 which are interconnected by a narrow opening 19. The upper recess 17 defines a cylindrical chamber 23 which is closed at its top by threaded plug 24. A valve assembly mounted within chamber 23 comprises piston 22 having depending therefrom stem 25. The piston 22 is reciprocally movable within chamber 23, with adjustment pin 24*a* limiting the upward movement. Conventional o-rings 28 may be used at the interface of the various surfaces for fluid seals as illustrated. Threaded set screws 29 may be used to anchor cap 24 and pin 24*a* at the proper location within recess 17.

Side ports 26 and 27 are formed in the wall of the die body 16 to provide communication to chamber 23 above and below piston 22, respectively. As described in more detail below, the ports 26 and 27 serve to conduct air (referred to as instrument gas) to and from each side of piston 22.

Figure 5:
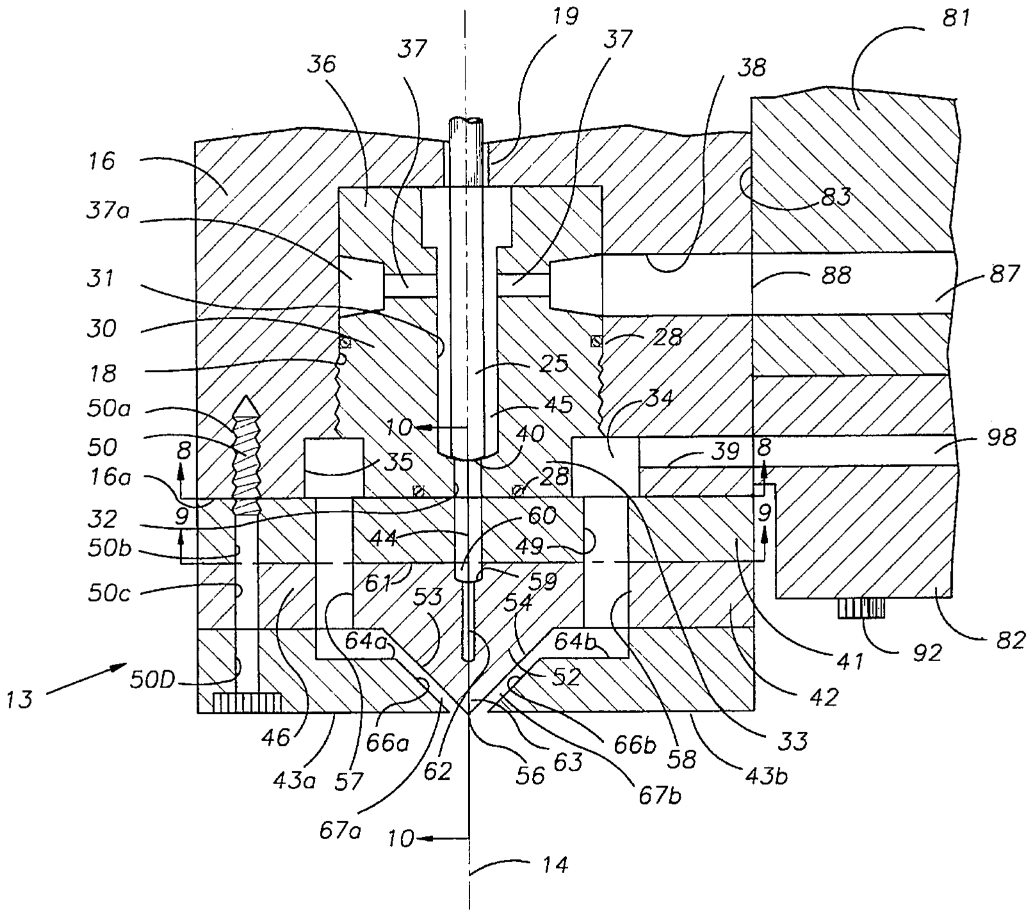
FIG. 5 is an enlarged sectional view illustrating the structure of the die tip assembly.
Figure 8:
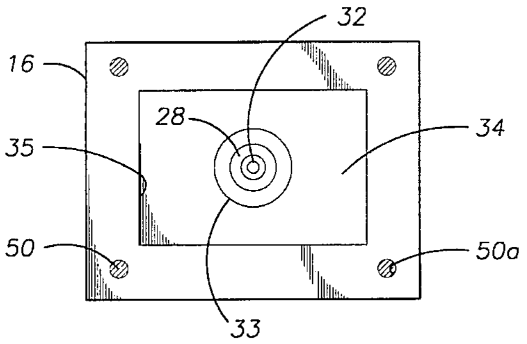
FIGS. 8 and 9 are enlarged sectional views of the module shown in FIG. 5 with the cutting plane shown by lines 8—8 and 9—9 thereof.

Referring to FIGS. 4 and 5, lower recess 18 is formed in the downwardly facing surface 16*a* of body 16. This surface serves as the mounting surface for attaching the die tip assembly 13 to the die body 16. Mounted in the lower recess 18 is a threaded valve insert member 30 having a central opening 31 extending axially therethorough and terminating in valve port 32 at its lower extremity. A lower portion 33 of insert member 30 is of reduced diameter and in combination with die body inner wall 35 define a downwardly facing cavity 34 as shown in FIG. 8. Threaded bolt holes 50*a* formed in the mounting surface 16*a* of the die body receive bolts 50. As described later, bolts 50 maintain the die tip assembly in stacked relationship and secured to the die body 16. Upper portion 36 of insert member 30 abuts the top surface of recess 18 and has a plurality (e.g. 4) of circumferential ports 37 formed therein and in fluid communication with the central passage 31. An annular recess 37*a* extends around the upper portion 36 interconnecting the ports 37.

Valve stem 25 extends through body opening 19 and axial opening 31 of insert member 30, and terminates at end 40 which is adapted to seat on valve port 32. The annular space 45 between stem 25 and opening 31 is sufficient for polymer melt to flow therethrough. End 40 of stem 25 seats on port 32 with piston 22 in its lower position within chamber 23 as illustrated in FIG. 4. As discussed below, actuation of the valve moves stem end 40 away from port 32 (open position), permitting the flow of polymer melt therethrough. Side port 38 flows through port 37, through annular space 45 discharging through port 32 into the die tip assembly via port 44. Conventional o-rings 28 may be used at the interface of the various surfaces as illustrated in the drawings.

The die tip assembly comprises a stack-up of four parts: a transfer plate 41, a die tip 42, and two air plates 43*a* and 43*b*. The assembly 13 can be preassembled and adjusted prior to mounting onto the die body 16.

Figure 9:
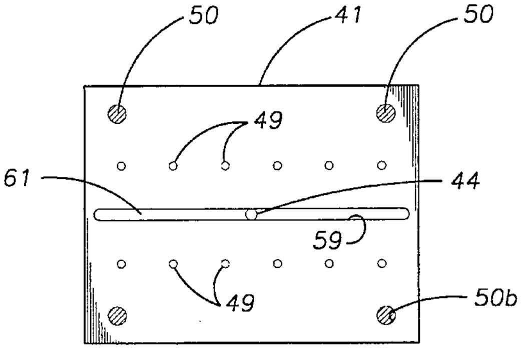

As shown in FIGS. 5 and 9, the transfer plate 41 is a thin metal member having a central polymer opening 44 formed therein. Two rows of air holes 49 flank the opening 44 as illustrated in FIG. 9. When mounted on the lower mounting surface 16*a* of die body 16, the transfer plate 41 covers the cavity 34 and therewith defines an air chamber with the air holes 49 providing outlets for air from cavity 34. Opening 44 registers with port 32 with o-ring 28 providing a fluid seal at the interface surrounding port 32.

The die tip 42 comprises a base member 46 which is coextensive with the transfer plate 41 and the mounting surface 16*a* of die body 16, and a triangular nosepiece 52 which may be integrally formed with the base. The nosepiece 52 is defined by converging surfaces 53 and 54 which meet at apex 56, which may be discontinuous, but preferably is continuous along the die. The portions of the base 46 extending outwardly from the nosepiece 52 (as viewed in FIG. 5) serve as flanges for mounting the base to the assembly and provide means for conducting the air through the base. The flanges of the base have air holes 57 and 58 and mounting holes 50*c* (one shown in FIG. 5) which register with the mounting holes 50*b* of the transfer plate 41 and 50*a* of body 16, as well as 50*d* of air plate 43*a*. The number, spacing, and positioning of the air holes 49 in the transfer plate 41 so that in the assembled condition, the air holes of transfer plate 41 register with the air holes of the die tip base 46.

The number of air holes formed in the transfer plate and the die tip base may vary within wide ranges, but from 5 to 10 air holes per inch as measured longitudinally along the die tip as viewed in FIG. 9, should be sufficient for most applications.

Although the apex 56 of the die tip 42 is discontinuous at the interface between modules, in the assembled position the inter-module spacing preferrably is very small so the aggregate of the side-by-side modules is very similar in performance to a continuous die tip apex extending the full length of the die. The result is a meltblown product with good uniformity over the die length.

Figure 10:
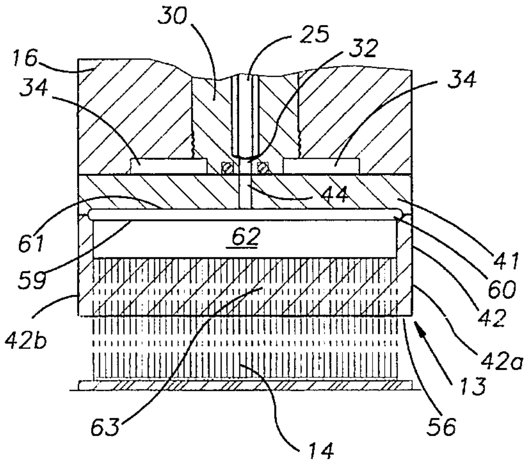
FIG. 10 is a sectional view of the die tip assembly of the module with the cutting plane taken along line 10—10 of FIG. 5.

As seen in FIGS. 5 and 10, a groove 59 is formed at the center of the die tip base 46 and extends in a longitudinal direction midway between two rows of air holes 57 and 58. The groove 59 is closed on one side by a downwardly facing surface 61 of the transfer plate 41 defining a header chamber 60. Surface 61 may be flat or may be a longitudinal groove which mirrors groove 59 of the die tip as seen in FIG. 10. Header chamber 60 is fed at its mid point by opening 44 of the transfer plate 41 and thus serves to distribute the polymer melt entering the die tip laterally therein.

Extending downwardly within the die tip 42 and coextensive with the groove 59, is an elongate channel 62. A plurality of orifices 63 formed along the apex of the nosepiece penetrate passage 62. The orifices 63 form a row of orifices spaced along the apex 56 for discharging polymers therefrom. The header channel 62 and row of orifices 63 in the apex are coextensive extending substantially the full width of the die body 16 as viewed in FIG. 10.

Figure 11:
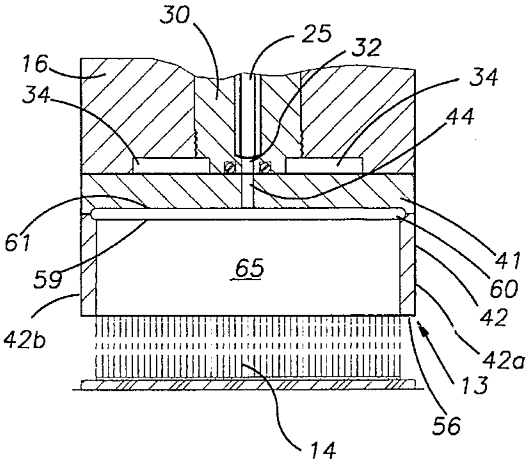
FIG. 11 is a view similar to FIG. 10 illustrating another embodiment of the die tip assembly construction.

In lieu of orifices, a slot 65 may be formed extending longitudinally along the apex as shown in FIG. 11. The use of slot 65 may be preferred for processing materials with low viscosity or in applications where a large polymer throughput is required. The material discharging from slot 65 will generally not be in the form of finely divided filaments as in the case of orifices 63. However, for continuity the material discharged from slot 65 will be referred to as filaments since converging air sheets will tend to disperse the polymer into filament-like segments.

As has been mentioned, the inter-module spacing is very small and precise so that in the assembled die the orifice spacing between modules is essentially the same as along the modules themselves. This is accomplished by designing the thickness of side walls 42*a* and 42*b* (see FIG. 10) to be small. The result is a substantially continuous linear apex structure 68 (see FIG. 2) over the entire length of the die, with the orifice spacing therealong being substantially uniform.

Air plates 43*a* and 43*b* are in flanking relationship to the nosepiece and include confronting converging surfaces 66*a* and 66*b*. These surfaces in combination with the converging surfaces 53 and 54 of the nosepiece 52 define converging air slits 67*a* and 67*b* which meet at the apex 56. The inner surfaces of each air plate are provided with recesses 64*a* and 64*b* which are aligned with air holes 57 and 58 in base 46. Air is directed to opposite sides of the nosepiece into the converging slits and discharged therefrom as converging air sheets.

The assemblage of the four components 41,42, and 43*a*, *b* of the die tip assembly 13 may be accomplished by aligning up the parts and inserting bolts 50 through clearance holes 50*b*, 50*c*, and 50*d* into the threaded hole 50*a*. Tightening bolt 50 maintains the alignment of the parts. Alternatively, the die tip assembly may be preassembled before attaching to body 16 by countersunk bolts extending downwardly from the transfer plate, through the die tip, and into the air plates with the base of the die tip sandwiched therebetween. The assemblage may then be attached to body 16 using bolts 50. This is the design disclosed in U.S. Pat. No. 5,145,689, the disclosure of which is incorporated herein by reference.

Note that the interface between the three components of the die tip assembly do not need seals because the machine surfaces provide a seal themselves. It should also be observed that for purposes of this invention, the transfer plate may be considered a part of the base of the die tip 42. A transfer plate 41 is used merely to facilitate the construction of the die tip assembly.

Manifold:

As best seen in FIG. 4, the manifold 11 is constructed in two parts: an upper body 81 and a lower body 82 bolted to the upper body by spaced bolts 92. The upper body 81 and lower body 82 have mounting surfaces 83 and 84, respectively, which lie in the same plane for receiving modules 12.

Figure 7:
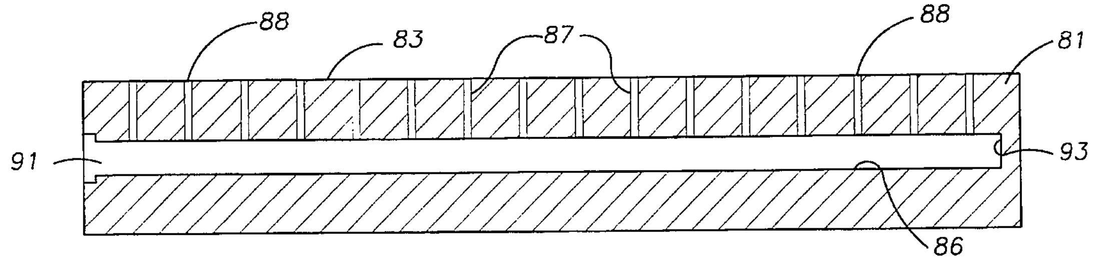
FIG. 7 is a horizontal sectional view of the manifold with the cutting plane taken generally along the line 7—7 of FIG. 4.

As shown in FIGS. 1, 5, and 7, the upper body manifold body 81 has formed therein polymer header passage 86 extending longitudinally along the interior of body 81 and side feed passages 87 spaced along the header passage 86 for delivering polymer to each module 12. The polymer feed passages 87 have outlets 88 which register with passage 38 of its associated module 12. The polymer header passage 86 has a side inlet 91 at one end of the body 81 and terminates at 93 near the opposite end of the body 81. A connector block 94 (see FIG. 1) bolted to the side of body 81 has a passage 96 for directing polymer from feed line 97 to the header channel 86. This connector block 94 may include a polymer filter. A polymer melt delivered to the die assembly flows from line 97 through passages 96 and 86 and in parallel through the side feel passages 87 to the individual modules 12.

Figure 6:
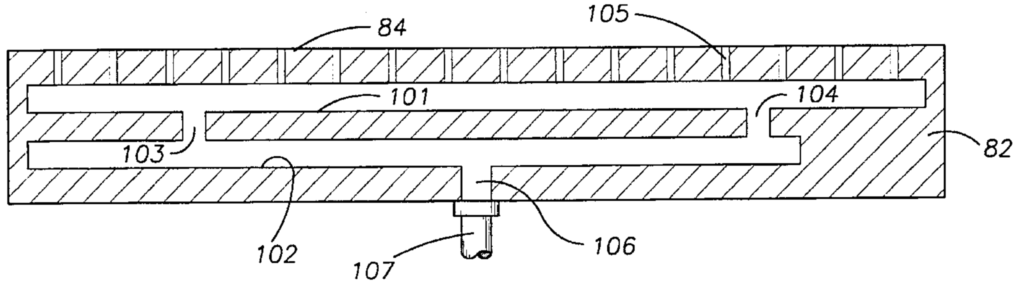
FIG. 6 is a horizontal sectional view of the manifold of the meltblowing die assembly with the cutting plane taken along with 6—6 of FIG. 4.

Air is delivered to the modules through the lower block 82 of the manifold 11 as shown in FIGS. 4 and 6. The air passages in the lower block 82 are in the form of a network of passages comprising a pair of passages 101 and 102 interconnecting side ports 103 and 104, and module air feed ports 105 longitudinally spaced along bore 101. Air inlet passage 106 connects to air feed line 107 near the longitudinal center of block 82. Air feed ports 105 register with air passage 39 of its associated.

Heated air enters body 82 through line 107 and inlet 106. The air flows through passage 102, through side passages 103 and 104 into passage 101, and in parallel through module air feed ports 105. The network design of manifold 82 serves to balance the air flow laterally over the length of the die.

The instrument air for activating valve 21 is delivered to the chamber 23 of each module 12 by air passages formed in the block 81 of manifold 11. As best seen in FIG. 4, instrument air passages 110 and 111 extend through the width of body 81 and each has an inlet 112 and an outlet 113. Outlet 113 of passage 110 registers with port 26 formed in module 12 which leads to chamber 23 above piston 22; and outlet 113 of passage 111 registers with port 27 of module 12 which leads to chamber 23 below piston 22.

An instrument air block 114 is bolted to block 81 and traverses the full length of the instrument air passages 110 and 111 spaced along body 81 (see FIG. 1). The instrument air block 114 has formed therein two longitudinal channels 115 and 116. With the block 114 bolted to body 81, channels 115 and 116 communicate with the instrument air passages 110 and 111, respectively. Referring to FIGS. 3 and 4, instrument tubing 117 and 118 deliver instrument air from control valve 119 to flow ports 108 and 109 which feed channels 115 and 116 in parallel. Channels 115 and 116 feed ports 110 and 111 in parallel.

Each module 12 is provided with an internal valve 21 for controlling the flow of polymer through the module. The valve and valve actuator are similar in construction to those disclosed in U.S. Pat. No. 5,269,670, the disclosure of which is incorporated herein by reference.

Referring to FIG. 4, valve 21 as described above comprises piston 22 reciprocatingly disposed in chamber 23 and defining therein upper and lower chambers above and below the piston respectively. Valve stem 25 distends from the piston and has distal end 40 adapted to seat on port 32. Pin 24*a* is secured to adjustable plug 24 and limits the upward stroke of piston 23 and stem 25. Spring 55 interposed between plug 24 and piston 22 impacts a downward force on the piston and acts to seat valve tip 40 on port 32 to close the port. Conventional o-rings 28 are provided for sealing the valve at the required locations.

For clarity, actuator 20 and tubing 117 and 118 are shown schematically in FIG. 4. Actuator 20 comprises three-way solenoidal air valve 119 coupled with electronic controls 120.

The valve 21 of each module 12 is normally closed with the chamber 23 above piston 22 being pressurized and chamber 23 below piston 22 being vented through valve control 119. Spring 55 also acts to maintain the closed position. To open the valves 21 of the modules 12, the 3-way control valve 119 is actuated by controls 120 sending instrument gas through tubing 118, channel 116, through passage 111, port 27 to pressurize chamber 23 below piston 22 and while venting chamber 23 above piston 22 through port 26, passage 110, channel 115 and tubing 117. The excess pressure below piston 22 moves the piston and stem 25 upwardly opening port 32 to permit the flow of polymer therethrough.

In a preferred embodiment all of the valves are activated simultaneously using a single valve actuator 20 so that polymer flows through all the modules in parallel, or there is no flow at all through the die. In other embodiments, individual modules or groups of modules may be activated using multiple actuators 20 spaced along the die.

A particularly advantageous feature of the present invention is that it permits the construction of a meltblowing die with a wide range of possible lengths using standard sized manifolds and interchangeable, self-contained modules. Variable die length may be important for coating substrates of different sizes from one application to another. The following sizes and numbers are illustrative of the versatility of modular construction.

| Die Assembly | Broad Range | Preferred Range | Best Mode |
|---|---|---|---|
| Number of Modules | 3–6,000 | 5–100 | 10–50 |
| Length of Modules (inches) | 0.25–1.50" | 0.5–1.00" | 0.5–0.8" |
| Orifice Diameter (inches) | 0.005–0.050" | 0.01–0.040" | 0.015–0.030" |
| Orifices/Inch | 5–50 | 10–40 | 10–30 |

Depending on the desired length of the die, standard sized manifolds may be used. For example, a die length of one meter could employ 54 modules mounted on a manifold 40 inches long. For a 20 inch die length 27 modules would be mounted on a 20 length manifold.

For increased versatility in the present design, the number of modules mounted on a standard manifold (e.g. one meter long) may be less than the number of module mounting places on the manifold. For example, FIGS. 1 and 2 illustrate a die having a total capacity of 16 modules. If, however, the application calls for only 14 modules, two end stations may be sealed using plates 99*a* and 99*b* disposed sealingly over the stations and secured to the die manifold using bolts. Each plate will be provided with a gasket or other means for sealing the air passages 105, polymer passage 87, and instrument air passages 110 and 111.

The plates may also be useful in the event a module requires cleaning or repair. In this case the station may be sealed and the die continue to operate while the module is being worked on.

The die assembly may also include electric heaters (not shown) and thermocouple (not shown) for heat control and other instruments. In addition, air supply line 107 may be equipped with an in-line electric or gas heater.

Assembly and Operation:

As indicated above, the modular die assembly can be tailored to meet the needs of a particular operation. In FIG. 1, 14 modules, each 0.74 inches in width, are mounted on a 13" long manifold. For illustrative purposes two end stations have been rendered inoperative using sealing plates 99*a* and *b* as has been described. The lines, instruments, and controls are connected and operation commenced. A hot melt adhesive is delivered to the die through line 97, hot air is delivered to the die through line 107, and instrument air or gas is delivered through lines 117 and 118.

Actuation of the control valves opens port 32 as described previously, causing polymer melt to flow through each module. The melt flows in parallel through manifold passages 87, through side ports 38, thorough passages 37 and annular space 45, and through port 32 into the die tip assembly via passage 44. The polymer melt is distributed laterally in header channels 60 and 62 and discharges through orifice 63 as side-by-side filaments 14. Air meanwhile flows from manifold passage 105 into port 39 through chamber 34, holes 49, 57 and 58, and into slits 66 and 67 discharging as converging air sheets at or near the die tip apex 56. The converging air sheets contact the filaments discharging from the orifices and by drag forces stretch them and deposit them onto an underlying substrate 15 in a random position. This forms a generally uniform layer of meltblown material on the substrate.

Typical operational parameters are as follows:

| Polymer | Hot melt adhesive |
|---|---|
| Temperature of the Die and Polymer | 280° F. to 325° F. |
| Temperature of Air | 280° F. to 325° F. |
| Polymer Flow Rate | 0.1 to 10 grms/hole/min. |
| Hot Air Flow Rate | 0.1 to 2 SCFM/inch |
| Deposition | 0.05 to 500 g/m$^2$ |

As indicated above, the die assembly 10 may be used in meltblowing adhesives, spray coating resins, and web forming resins. The adhesives include EVA's (e.g. 20–40 wt % VA). These polymers generally have lower viscosities than those used in meltblown webs. Conventional hot melt adhesives useable include those disclosed in U.S. Pat. Nos. 4,497,941, 4,325,853, and 4,315,842, the disclosures of which are incorporated herein by reference. The above melt adhesives are by way of illustration only; other melt adhesives may also be used.

The typical meltblowing web forming resins include a wide range of polyolefins such as propylene and ethylene homopolymers and copolymers. Specific thermoplastics includes ethylene acrylic copolymers, nylon, polyamides, polyesters, polystyrene, poly(methyl methacrylate), polytrifluoro-chloroethylene, polyurethanes, polycarbonates, silicone sulfide, and poly(ethylene terephthalate), pitch, and blends of the above. The preferred resin is polypropylene. The above list is not intended to be limiting, as new and improved meltblowing thermoplastic resins continue to be developed.

Polymers used in coating may be the same used in meltblowing webs but at somewhat lower viscosities. Meltblowing resins for a particular application can readily be selected by those skilled in the art.

In meltblowing resins to form webs and composites, the die assembly 10 is connected to a conventional extruder or polymer melt delivery system such as that disclosed in U.S. Pat. No. 5,061,170, the disclosure of which is incorporated herein by reference. With either system, a polymer by-pass circuit should be provided for intermittent operation.

What is claimed is:

1. A modular meltblowing die comprising:

a. a manifold having a polymer flow passage and an air flow passage formed therein; and b. a plurality of self-contained die modules mounted in side-by-side relationship on the manifold, each module having (i) a body having a polymer flow passage and an air flow passage formed therein, which are, respectively, in fluid communication with the polymer flow passage and the air flow passage of the manifold, (ii) a die tip assembly comprising (1) a die tip having a base portion mounted on the module body and a triangular nosepiece protruding outwardly from the base in a direction away from the module body and terminating in an apex extending substantially the full width of the module body, said apex having formed therein polymer discharge means for discharging a row of filaments therefrom, said die tip base having formed therein a polymer flow passage in fluid communication with the polymer flow passage of the die body and being shaped to distribute the polymer laterally within the die tip for substantially the full width of the module and deliver polymer to the polymer discharge means, and air flow passages in fluid communication with the air flow passage of the body and extending through the die tip base;

(2) air plates mounted on opposite sides of the nosepiece and therewith defining converging air slits, each air slit being in fluid communication with an air flow passage of the die tip base; and (iii) an internal valve mounted in each module die body for controlling polymer flow therethrough, said modules mounted on the manifold in side-by-side relationship the nosepieces thereof defining a substantially continuous or discontinuous apex for the full length of the meltblowing die.

2. The modular meltblowing die of claim 1 wherein the polymer discharge means formed in the apex comprises a plurality of orifices spaced along the apex.

3. The modular meltblowing die of claim 2 wherein the spacing of the orifices along the apex ranges from 5 to 50 orifices per inch.

4. The modular meltblowing die of claim 1 wherein each module is from 1 to 10 inches as measured along the apex and the die includes from 3 to 50 of the modules.

5. The modular die of claim 4 wherein the modules are substantially identical.

6. The modular meltblowing die of claim 5 wherein the modules are detachably mounted on the manifold so that the length of the modular die may be varied by removing or adding modules to the manifold.

7. The modular meltblowing die of claim 1 which further comprises means for delivering a hot melt polymer to the manifold polymer flow passage whereby polymer flows through the manifold, through the body polymer flow passage, through the die tip assembly polymer flow passage, and through the discharge means discharging as a plurality of filaments; and means for delivering hot air to the manifold air flow passages whereby air flows through the manifold, through each module discharging as converging air sheets at the apex to contact the polymer filaments.

8. The modular meltblowning die of claim 2 wherein the spacing of the orifices along the combined apex of the modules ranges from 10 to 40 orifices per inch.

9. A modular meltblowing die comprising (a) a manifold having (i) an external mounting surface, (ii) a polymer header channel, (iii) a plurality of polymer openings extending from the polymer header channel through the mounting surface at spaced apart locations, (iv) an air header channel and a plurality of spaced apart air openings extending from the air header channel through the mounting surface at spaced apart locations;

(b) from 4 to 50 substantially identical self-contained die modules detachably mounted on the mounting surface of the manifold in side-by-side contacting relationship, each module comprising (i) a body having a width dimension in contact with the module mounting surface, a polymer flow passage in fluid communication with one of the polymer openings of the manifold, and an air flow passage in fluid communication with one of the air openings of the manifold, (ii) a die tip assembly comprising a die tip having a base portion mounted on the module body, and a triangular nosepiece protruding outwardly from the base portion and terminating in an apex extending substantially the full width of the module body width dimension, said apex having formed therein a row of orifices at spaced apart locations, a polymer flow header in fluid communication with the air passage of the body, a pair of air plates mounted on opposite sides of the triangular nosepiece and therewith defining converging air slits, each air slit being in fluid communication with the air passage of the die tip, and (iii) an internal valve mounted in said module body for controlling polymer flow therethrough, the die modules in combination defining a substantially continuous linear apex for the full length of the meltblowing die with said orifices spaced therealong.

10. The modular meltblowing die of claim 9 wherein the orifices extending along the substantially continuous linear apex range from 5 to 50 per inch.

* * * * *